United States Patent
Maghoul et al.

(10) Patent No.: US 10,289,637 B2
(45) Date of Patent: May 14, 2019

(54) ENTITY GENERATION USING QUERIES

(71) Applicant: Excalibur IP, LLC, New York, NY (US)

(72) Inventors: Farzin Maghoul, Hayward, CA (US); Reiner Kraft, Gilroy, CA (US)

(73) Assignee: Excalibur IP, LLC, New York, NY (US)

( * ) Notice: Subject to any disclaimer, the term of this patent is extended or adjusted under 35 U.S.C. 154(b) by 461 days.

(21) Appl. No.: 14/304,754

(22) Filed: Jun. 13, 2014

(65) Prior Publication Data

US 2015/0363509 A1    Dec. 17, 2015

(51) Int. Cl.
*G06F 16/30* (2019.01)
*G06F 16/33* (2019.01)
*G06F 16/951* (2019.01)

(52) U.S. Cl.
CPC ............ *G06F 16/33* (2019.01); *G06F 16/951* (2019.01)

(58) Field of Classification Search
CPC .... G06F 17/30864; G06F 17/30; G06F 16/33; G06F 16/951
See application file for complete search history.

(56) References Cited

U.S. PATENT DOCUMENTS

| | | | |
|---|---|---|---|
| 7,882,107 B2* | 2/2011 | Baader | G06F 17/30646 707/736 |
| 9,037,568 B1* | 5/2015 | Xian | G06F 17/30976 707/713 |
| 2011/0231347 A1* | 9/2011 | Xu | G06F 17/30864 706/12 |

OTHER PUBLICATIONS

Zheng, et al, "Entity Disambiguation with Freebase," Published in: Proceeding WI-IAT '12 Proceedings of the The 2012 IEEE/WIC/ACM International Joint Conferences on Web Intelligence and Intelligent Agent Technology—vol. 01, IEEE Computer Society Washington, DC, USA, pp. 82-89. 2012.

* cited by examiner

*Primary Examiner* — Kristopher Andersen
(74) *Attorney, Agent, or Firm* — Berkeley Law & Technology Group, LLP (57) ABSTRACT

Disclosed are embodiments of methods and/or systems for introducing new entities into a knowledge graph based at least in part on patterns of queries and/or use cases.

20 Claims, 4 Drawing Sheets

ENTITY GENERATION USING QUERIES

BACKGROUND

1. Field

This disclosure relates to generating new entities for placement within, for example, a knowledge graph.

2. Information

A knowledge graph, in this context, comprises a representation to show relationships among various entities, such as a tree, network or acyclic graph representation, in the form of physical signals and/or states, such as digital signals and/or states. For example, entities of a knowledge graph may be organized into nodes and may be associated via links (also referred to as edges). Nodes, for example, may comprise distinct objects, such as, for example, movie titles, personalities, events, places, abstract ideas, and so forth. A knowledge graph may, thus, also comprise links between and/or among nodes to illustrate, for example, relationships among entities. Thus, in one possible example, a node of a knowledge graph may comprise an entity representing a movie title (e.g., "Harry Potter and the Sorcerer's Stone") along with links to writers, directors, producers, lead actors/actresses, and so forth, that may be associated with a movie title. Movie titles, for example, may further include links to additional movie titles (e.g., "Harry Potter and the Chamber of Secrets"), which may link to additional groups of related entities. Accordingly, a knowledge graph may enable a user, for example, to understand and/or better understand a topic by linking entities related to a topic in context with other entities.

However, discovering new entities for placement into a knowledge graph, and/or extension of a knowledge graph, may be more challenging. For example, if a new movie is released to the public, one or more human editors may painstakingly modify existing knowledge graphs to introduce an entity representing the new movie, as well as create entities, for example, which may correspond with a movie's cast, directors, producers, and others who may be linked with the new movie in the graph, for example. A human editor may be additionally tasked with forming contextual relationships among newly introduced entities and/or pre-existing entities so that knowledge graphs may embody up-to-date graphical representations of topics, for example. Knowledge graphs that are not updated may fall short of meeting user's expectations that knowledge graphs be more current, for example.

BRIEF DESCRIPTION OF DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or for clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems, and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes, and/or equivalents may occur to those skilled in the art. It is, therefore, to be understood that appended claims are intended to cover any and all modifications and/or changes as fall within claimed subject matter.

Reference throughout this specification to "one implementation," "an implementation," "one embodiment," "an embodiment" and/or the like may mean that a particular feature, structure, and/or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals, and/or the like. It should be understood, however, that all of these or similar terms are to be associated with appropriate physical quantities and are intended to merely be convenient labels.

Likewise, in this context, the terms "coupled," "connected," and/or similar terms, may be used. It should be understood that these terms are not intended as synonyms. Rather, "connected" may be used to indicate that two or more elements and/or other components, for example, are in direct physical and/or electrical contact; while, "coupled" may mean that two or more components are in direct physical including electrical contact; however, "coupled" may also mean that two or more components are not in direct contact, but may nonetheless co-operate and/or interact. The term "coupled" may also be understood to mean indirectly connected, for example, in an appropriate context.

The terms, "and," "or," "and/or," and/or similar terms, as used herein, may include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms may be used to describe any feature, structure, and/or characteristic in the singular and/or may be used to describe a plurality and/or some other combination of features, structures and/or characteristics. Though it should be noted that this is merely an illustrative example and claimed subject matter is not limited to this example. Again, particular context of description and/or usage may provide helpful guidance regarding inferences to be drawn.

In the context of the present disclosure, the term "network device" refers to any device capable of communicating via and/or as part of a network. Network devices may be capable of sending and/or receiving signals (e.g., signal packets), such as via a wired and/or wireless network, may be capable of performing arithmetic and/or logic operations, processing and/or storing signals, such as in memory as physical memory states, and/or may, for example, operate as a server. Network devices capable of operating as a server, and/or otherwise, may include, as examples, dedicated rack-mounted servers, desktop computers, laptop computers, set top boxes, tablets, netbooks, smart phones, integrated devices combining two or more features of the foregoing devices, the like and/or any combination thereof.

A network may comprise two or more network devices and/or may couple network devices so that signal communications, such as in the form of signal packets, for example, may be exchanged, such as between a server and a client device and/or other types of network devices, including among wireless devices coupled via a wireless network, for example. It is noted that the terms, server, server device, server computing device, server computing platform, and/or similar terms may be used interchangeably. Similarly, the terms "client," "client device," "client computing device," "client computing platform," and/or similar terms may also be used interchangeably. While in some instances, for ease of description, these terms may be used in the singular, such as by referring to a "client computing device", a "server device," and/or a "server" the description is intended to encompass one or more client devices and/or one or more server devices, as appropriate. Along similar lines, references to a "database" are understood to mean, one or more databases and/or portions thereof, as appropriate.

A network may also include now known, and/or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures and/or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term "transparent" refers to communicating in a manner so that communications may pass through intermediaries, but without the communications necessarily specifying one or more intermediaries, such as intermediate devices, and/or may include communicating as if intermediaries, such as intermediate devices, are not necessarily involved. For example, a router may provide a link between otherwise separate and/or independent LANs. In this context, a private network refers to a particular, limited set of network devices able to communicate with other network devices in the particular, limited set, such as via signal packet transmissions, for example, without re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network, for example.

It should be understood that for ease of description, a network device may be embodied and/or described in terms of a computing device. However, it should further be understood that this description should in no way be construed that claimed subject matter is limited to one embodiment, such as a computing device and/or a network device, and, instead, may be embodied as a variety of devices and/or combinations thereof, including, for example, one or more illustrative examples.

The term "Internet" may refer to a decentralized global network of interoperable networks, including devices that are part of those interoperable networks. The term "world wide web" (WWW) and/or similar terms may also be used, but may refer to a subset of the Internet substantially compliant and/or substantially compatible with a particular set of communication protocols, such as the hypertext transfer protocol, for example. Signal packets, also referred to as signal packet transmissions, may be communicated among connection points of a network, where a connection points may comprise one or more network devices, for example. As an illustrative example, but without limitation, a connection point may comprise one or more sites employing a local network address. Likewise, a device, such as a network device, may be associated with that connection point. A signal packet may, for example, be communicated via a communication channel and/or a communication path comprising the Internet, from a site via an access point coupled to the Internet. Likewise, a signal packet may be forwarded via network connection points to a target site coupled to a local network, for example. A signal packet communicated via the Internet, for example, may be routed via a path comprising one or more gateways, servers, etc. that may, for example, route a signal packet in accordance with a target address and availability of a network path of network connection points to a target address.

Physically connecting portions of a network via a hardware bridge, as one example, may be done, although other approaches also exist. A hardware bridge, however, may not typically include a capability of interoperability via higher levels of a network protocol. A network protocol refers to a set of signaling conventions for communications between and/or among devices in a network, typically network devices, but may include computing devices, as previously discussed; for example, devices that substantially comply with the protocol and/or that are substantially compatible with the protocol. In this context, the term "between" and/or similar terms are understood to include "among" if appropriate for the particular usage. Likewise, in this context, the terms "compatible with," "comply with," and/or similar terms are understood to include substantial compliance and/or substantial compatibility. Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers.

In contrast, a virtual private network (VPN) may enable a remote device to communicate via a local network. A router may allow communications in the form of transmissions (e.g., signal packets), for example, to occur from a remote device to a VPN server on a local network. A remote device may be authenticated and a VPN server, for example, may create a special route between a local network and the remote device through an intervening router.

Media networks, such as the Yahoo!™ network, for example, may be increasingly seeking ways to attract users to their networks and/or to retain users within their networks for extended periods of time. A media network may, for example, comprise an Internet website or group of websites having one or more sections. For instance, the Yahoo!™ network includes websites located within different categorized sections, such as sports, finance, current events, and games, to name just a few non-limiting examples among a variety of possible examples. To attract and/or to retain users within its network, Yahoo!™ and/or other media networks may continually strive to provide content relating to categorized sections that may be interesting and/or of use to users.

As previously described, a knowledge graph, in this context, comprises a representation to show relationships among various entities, such as a tree, network and/or acyclic graph representation, including various combination representations, for example, in the form of physical signals and/or states, such as digital signals and/or states. As the term is used herein, an "entity" may be defined as a person, place, event, object, action, quality, concrete or abstract idea, title, body of knowledge, and/or any other entry of a knowledge graph. Entities of a knowledge graph may be organized using nodes and may be associated, via links (also referred to as edges), to other entities of a knowledge graph. Relationships among entities of a knowledge graph may be organized according to attributes of an entity. In one possible example, an entity comprising a movie title may link to other entities according to, for example, actors/actresses appearing in a movie. Thus, as can be imagined, a knowledge graph may comprise hundreds, thousands, millions, or larger number of links to other entities according to attributes of particular entities.

Entities of a knowledge graph may be organized into nodes, which may comprise one of numerous topics. Thus, in embodiments, a knowledge graph may comprise a virtually unlimited number of entities representing, for example, movie titles and/or personalities, sports personalities, historical events, political events, cities, regions, mathematical and/or scientific theories, weather phenomena, scientific phenomena, and so forth, and claimed subject matter is not limited to any particular size and/or arrangement nodes of a knowledge graph.

As previously indicated, entities of a knowledge graph may comprise attributes, which may encompass qualities, characteristics, and/or inherent features of an entity. In embodiments, attributes of one or more entities may be employed to link one or more entities with one another. Thus, in one possible example, an entity representing a particular movie title (e.g., "Harry Potter and the Sorcerer's Stone") may comprise an attribute for a leading actor (e.g., "Daniel Radcliffe"). Accordingly, a knowledge graph comprising a movie title entity "Harry Potter and the Sorcerer's Stone," may encompass one or more links to an actor entity "Daniel Radcliffe." In turn, the actor entity "Daniel Radcliffe" may comprise one or more attributes for movies in which the actor has starred, such as "Harry Potter and the Sorcerer's Stone," "Harry Potter and the Chamber of Secrets," and so forth. In this manner, attributes may be utilized to situate an entity within a knowledge graph in a manner that illustrates an entity's contextual relationships with other entities, for example.

Presenting more and/or reasonably up to date knowledge graphs to users may encourage users to remain within a media network for extended periods of time. As a user base of a media network increases, a media network may become more valuable to potential advertisers. Thus, typically, advertisers may be inclined to pay more money and/or provide other considerations to a media network in return for advertising to users, for example, via a media network, its partners, and/or subsidiaries. In an implementation, if a user displays a page (e.g., web page) comprising a knowledge graph, including a portion thereof, perhaps as a result of utilizing a search engine and/or other search tool, a server (and or other source), potentially located within and/or external to a processing and/or communications infrastructure of a media network, may deliver relevant content, which may include, for example, textual and/or multimedia content that may entice users to remain for a relatively extended period of time. Access to content, such as hyperlinks to websites located outside of a media network, may also be provided to users. Thus, even if users are directed to websites outside of a particular media network, users may remain loyal to the media network in the future if they believe that the network consistently provides access, such as hyperlinks, and/or otherwise directs them to relevant, up-to-date, and/or useful content.

In particular embodiments, a search query may be defined as a string comprising one or more letters, words, numbers, and/or other characters used to elicit a response from a search engine. In certain embodiments, responsive to submission of a search query, a search engine may provide path parameters, such as universal resource indicators, for example, to one or more electronic documents, such as web pages, which may be downloaded so that a user may access, view, and/or otherwise consume content relevant to one or more terms of a search query. As a non-limiting example, responsive to submission of a number of search queries from users, over time, a database and/or other collection of prior search queries may be mined or otherwise analyzed to ascertain previously unrecognized entities of a knowledge graph. In some embodiments, a search query may comprise an arrangement of one or more query segments, which may be defined as one or more groups of letters, words, numbers, and/or other characters which may form constituent parts that in combination comprises, for example, a search query. In many embodiments, a search query, comprising one or more search terms, may be submitted to a search engine via a user interface of, for example, a client computing device), and/or as a result of other types of interactions with client computing platforms (e.g., a web browser), for example, which may allow a user to gain access one or more pages (e.g., web pages), for example.

In some embodiments, search queries may be determined to adhere to a limited set of "search query patterns" or "query patterns." A search query pattern or query pattern may be defined as a recurring group of search query terms occurring in accordance with an at least loosely-defined arrangement. Thus, in one hypothetical example, just for the sake of illustration, users seeking weather-related parameters, such as whether or not rain may be likely during a certain time frame, may employ search query patterns using one or more combinations of search query terms such as "weather," "location," and "date," for example, Responsive to receipt of one or more search query patterns, such as "weather," "location," and "date", for example, a server, such as a query server, may perform one or more operations based, at least in part, on one or more modules of implementable instructions for a computing device. In this context, the term "query server" refers to one or more servers that include a capability to process a search query and/or, as a consequence of processing, deliver and/or generate search results that may be relevant to a processed search query. It is noted that terms, such as "operation," and/or "function," including similar terms, may be used interchangeably in this context. It is also noted that, in this context, the term 'click', 'click-through', including similar terms, are meant to refer to user interactions with a computing device, regardless of how executed, such as click, touch, hover, voice-command, etc.

In addition to providing search results, a query server may further organize and/or classify search queries into query patterns for storage in a database, for example. In an embodiment, a database may be organized and/or arranged into a taxonomy that may function to position submitted query patterns, for example, substantially according to an apparent and/or inferred intent of a query, and/or substantially in accordance with similar considerations, for example. In one instance, query patterns comprising a movie title and "show time," may be utilized to infer intent to ascertain a time of day at which a particular movie, which may be showing at a particular venue, may begin. In embodiments, a taxonomy may utilize semantically related terms to infer and/or otherwise deduce an apparent intent. Thus, for example, query patterns comprising the terms "show time," "start time," "when starting," and so forth, may be evaluated to be semantically related, for example, to the taxon "show time." Accordingly, a query taxonomy structured in accordance with an intent inferred from query patterns of submitted search queries, for example, may be termed, for example, a "user-intent centric taxonomy." However, it should be noted that claimed subject matter is intended to embrace other types of taxonomies, such as taxonomies having other subject matter as centric, for example, without limitation.

In one or more embodiments, submitted query patterns of a taxonomy may be organized into "use cases," which may be defined as a type and/or form of user interaction(s) with a search engine, for example. Thus, a use case may comprise, for example, a number of search query patterns representing, for example, one or more modes of user interaction with, for example, a search engine. For example, a search engine utilized for providing dictionary definitions may employ a use case comprising the query patterns of "What does [word] mean?" and/or "define [word]," in which [word] may correspond to a word and/or phrase for which a user may seek to understand its meaning and/or usage in a particular language. In embodiments, use cases may be evaluated and/or leveraged (e.g., "mined") to form one or more aggregated indexes of query pattern segments. Queries may, thus, be evaluated to determine whether query segments, which may comprise one or more search terms, such as bigrams (which may comprise a pair of consecutive written units such as letters, syllables, or words), a trigram (which may comprise three or more e consecutive written units such as letters, syllables, or words), and so forth correspond to entities already existing in a knowledge graph. Entities already known or likely to be known in a knowledge graph may be discarded in an embodiment. New entities, such as entities not already present in a knowledge graph, may be retained as candidate new entities in an embodiment. Candidate new entities may be filtered according, for example, to frequency of occurrence in submitted queries, such as user submitted queries. Filtered entity candidates may be added to a knowledge graph, again, for a particular embodiment, for example.

As described further herein, embodiments may involve a variety of techniques for identifying new entities for placement into a knowledge graph for example. One embodiment, for example, may employ extraction of query segments from a database, such as of query patterns (e.g., a user-centric intent taxonomy), which may be organized into related use cases for given entity types. As the term is used herein and as will be described with reference to FIG. 2, an "entity type" may be defined as a category and/or representation of use cases, illustrated below, for example. In an embodiment use cases may be leveraged to provide an approach toward new entity generation and/or placement of new entities in a knowledge graph. Of course, claimed subject matter is not limited in scope to particular examples, such as these illustrations.

Figure 1:
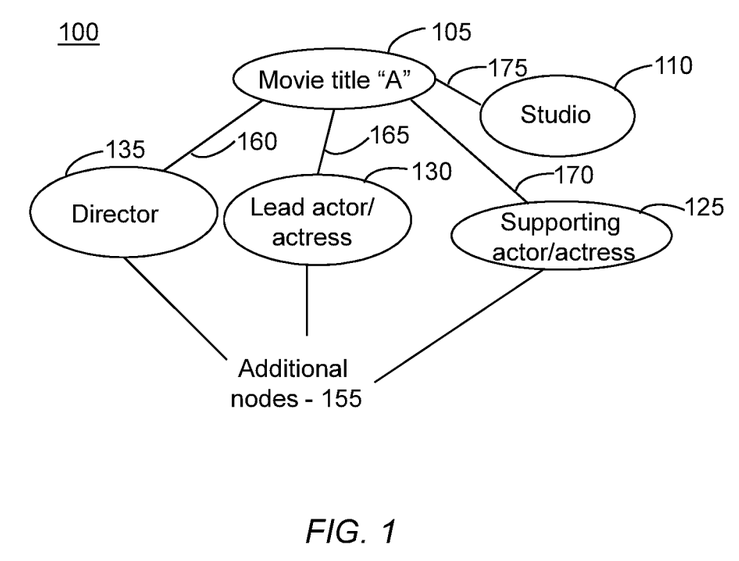
FIG. 1 is a diagram showing a portion of a knowledge graph in accordance with an embodiment.

FIG. 1 is a diagram showing a portion of a knowledge graph 100 in accordance with an embodiment. In FIG. 1, knowledge graph 100 shows an entity corresponding to movie title "A." Thus, in one possible example, movie title "A" 105 may represent any particular movie, such as "Gone with the Wind," "Harry Potter and the Sorcerer's Stone," and/or any one of potentially thousands or an even greater number of movie titles without limitation. Movie title "A" 105 may be linked, such as hyperlinked and/or otherwise associated with, director 135, by way of link 160, as well as being linked to lead actor/actress 130 by way of link 165. In this context, the term link and/or similar terms refers to one or more mechanisms and/or techniques to electronically depict a relation between and/or among entities. Movie title "A" may additionally be linked to studio 110, by way of link 175, and to supporting actor/actress 125, by way of link 170. Movie title "A" 105 may be linked with numerous other entities not shown in FIG. 1, such as producers, writers, choreographers, musicians, and so forth, which may number into the dozens, hundreds, thousands, or more. Claimed subject matter is not limited to illustrative examples, such as described herein. Further, director 135, lead actor/actress 130, supporting actor/actress 125 may be linked to a number of additional entities 150, which may number into the hundreds, thousands, and/or a greater number, without limitation. Again, claimed subject matter is not limited in this respect. New entities may be added and/or appended to a knowledge graph to encompass newly produced movies and/or other content, for example, as such content is created, venerated and/or otherwise proliferated, such as on-line and/or among users, for example.

Figure 2:
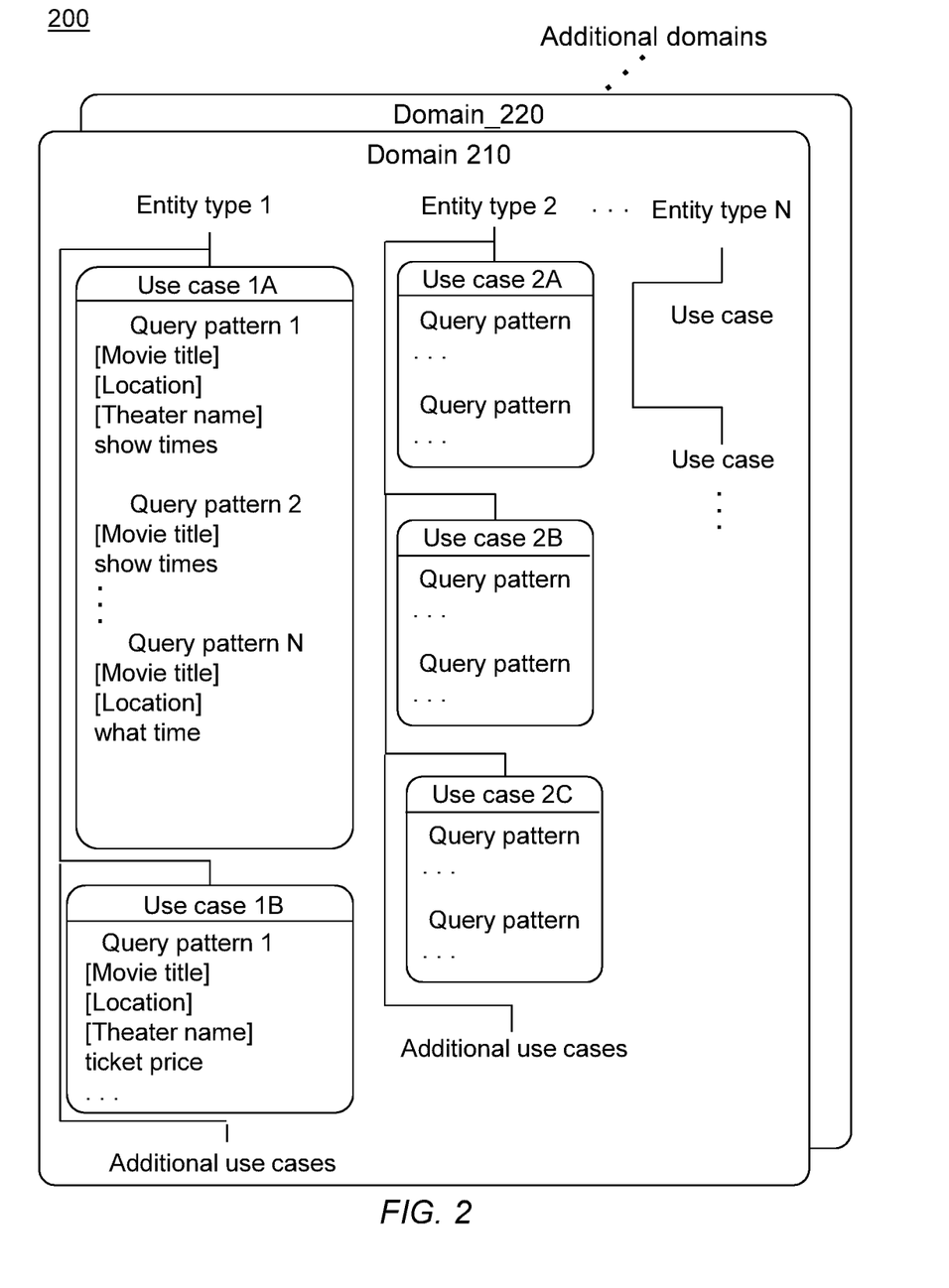
FIG. 2 is a diagram of an example taxonomy, which may be used to generate, for example, the knowledge graph of FIG. 1 according to an embodiment.

FIG. 2 is a diagram of an example taxonomy 200, which may be used to generate, for example, the knowledge graph of FIG. 1 according to an embodiment. Although FIG. 2 describes a particular arrangement, claimed subject matter is intended to embrace taxonomies comprising arrangements of all types of queries, such as queries from one or more users of client computing devices, queries from application program interfaces, database transaction queries, and so forth, and claimed subject matter is not limited in this respect. In a particular example, such as that of FIG. 2, queries may be classified at a relatively high level, such as substantially according to a query domain, for example, which may, at least in some embodiments, be defined as representing a higher level of abstraction than query patterns, use cases, and entity types. Domain 210 may operate as a database of received query patterns pertaining to any level grouping of queries, here, as an example, at a relatively high level, such as, for example, sports, media, computer science and technology, electronics, physics, biology, human interest, and/or any other grouping. Likewise, domain 220, as well as additional domains shown in FIG. 2, may also operate as a database of received query patterns, such as those enumerated with respect to domain 210, for example.

Thus, in one possible example, domain 210 of FIG. 2 may correspond to a high level grouping (e.g., may encompass a variety of potentially related content), here, as an illustration, comprising "media," for example, which may refer to any manner of mass communication, such as television, radio, newspapers, magazines, the Internet, movie theaters and cinemas, and so forth. Within domain 210, entity types, such as entity type 1, entity type 2, entity type N, and so forth, may represent a grouping of query patterns within domain 210. Thus, in one possible example, entity type 1 may represent query patterns that refer to movies presently being shown in theaters and/or cinemas. In some embodiments, classifying of particular query patterns into an entity type, such as entity type 1, which may be defined as a representation and/or category of use cases, such as use cases 1A, 1B, and so forth, may occur responsive to presence of one or more keywords in a query, one or more rules for associating a received query with query patterns, machine learning, and/or other types of situations. It should be noted, however, that claimed subject matter is not limited to any particular methodology and/or approach towards detecting query patterns as relevant to one or more entity types, for example.

In embodiments, additional entity types, such as entity type 2 through entity type N of FIG. 2, may be defined, for example, to correspond to additional groupings of query patterns within domain 210. Accordingly, in a possible example, entity type 2 may comprise query patterns that may correspond to movies not currently in cinemas or theaters, such as made-for-TV movies, movies formerly (but no longer) in cinemas or theaters, straight-to-DVD movies, and so forth. It is noted that generally higher level groupings include more content than at lower levels since multiple groupings at lower levels may be subsumed within a higher level grouping in a taxonomy.

Thus, in a similar manner, domain 220 may comprise, for example, queries relevant to the field of "people." Entity types within domain 220 (people) may include, for example, "personalities," which may comprise entity types for sports personalities, political personalities, historical personalities, and so forth. Likewise, additional domains of the taxonomy of FIG. 2 may comprise high-level groupings of queries, such as queries relevant to fields such as food, health and beauty, politics, and so forth, and claimed subject matter is not limited to any particular high-level query grouping.

Likewise, within entity type 1 of query domain 210, query patterns may be arranged, for example, into one or more use cases, which may be defined, as an organizing approach with respect to user interactions, such a type and/or form of user interaction(s) with a search engine, for example. Thus, for example, use case 1A, of FIG. 2 may comprise query patterns that may appear to reflect submitted queries pertaining to show times of movies of one or more nearby cinemas or movie theaters, for example. Thus, in one instance, use case 1A may follow a more generalized type of form such as [Movie title], [Location], [Theater name], and show times. In embodiments, "[Movie title]," "[Location]," and "[Theater name]" may represent entity classes, which may be defined as a higher-level category of entities such as multiple entity types. For example, "show times" may represent a contextual term, which may be defined as a query term that may provide, for example, a query context and/or other indicator of circumstances and/or setting of a particular query. Thus, a possible example of query pattern 1 within use case 1A may comprise "Gravity Santa Clara AMC show times," in which, a query pattern may be evaluated as follows:

"Gravity"=>entity class: [Movie title]
"Santa Clara"=>entity class: [Location]
"AMC"=>entity class: [Theater name]
"show times"=>context term In FIG. 2, use case 1A may comprise query pattern 2, which may be representative of a query pattern comprising fewer terms such as "[Movie title]", "[Location]," and "when playing." Thus, a possible example of query pattern 2 within use case 1A may comprise "Gravity Santa Clara when playing" in which, s query pattern may be reduced as follows:

"Gravity"=>entity class: [Movie title]
"Santa Clara"=>entity class: [Location]
"when playing"=>context term Accordingly, from FIG. 2, query patterns, such as query pattern 1, query pattern 2, and query pattern N, as examples, may comprise arrangements of query terms corresponding to submitted queries, such as user submitted queries. A considerable number of query patterns, such as 10, 15, 20, or a greater number, of query patterns, may, for example, comprise a given use case. In the example of use case 1A, users of computing devices, such as client computing devices, may submit queries of a variety of terms, which may comprise one or more of entity classes corresponding to [Movie title], [Location] along with a contextual term, such as "show times," "when playing," "what time," and/or many other contextual terms, that may, for example, be indicative of (e.g., an inference may be drawn regarding) a desire to determine a time of day at which an in-theater movie may begin, for example.

In FIG. 2, use case 1B may comprise query patterns of using entity classes similar to those of use case 1A (i.e., [Movie title], [Location], [Theater name], and so forth) along with a contextual term (e.g., "ticket price") that may pertain to price of a movie ticket. Although not shown in FIG. 2, use case 1B may comprise a number of additional query patterns, such as query patterns comprising other contextual terms, such as "ticket cost," "price," etc. Thus, in a manner similar to that of use case 1A, query patterns of use case 1B may comprise other contextual terms that may be indicative of a desire to determine a movie ticket price, for example. The embodiment of FIG. 2 also illustrates other entity types within domain 210 which may pertain to, for example, query patterns that may indicate a desire for content pertaining to movies not currently in cinemas or theaters, such as made-for-TV movies, straight-to-DVD movies, and so forth.

Figure 3:
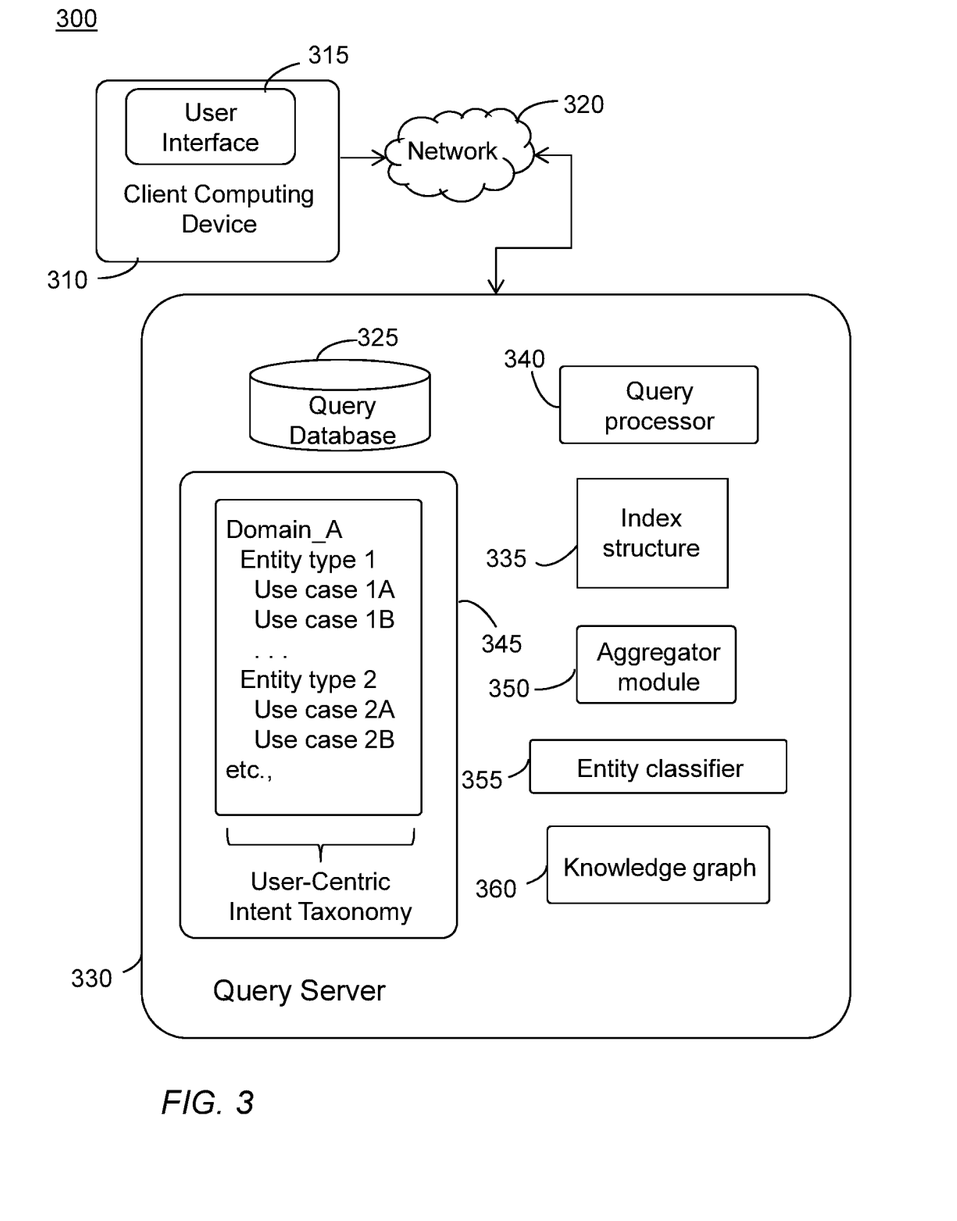
FIG. 3 is a schematic diagram of a client computing device capable of communicating with a server by way of one or more network devices according to an embodiment.

FIG. 3 is a schematic diagram of a computing device as an illustrative example, such as a client communicating with a server by way of one or more network devices according to an embodiment. Of course, in an embodiment, hardware, software and/or firmware, for example, may be arranged different than illustrated. For example, FIG. 3 provides a schematic diagram. Nonetheless, using the embodiment shown in FIG. 3 for illustrative purposes, in the embodiment of FIG. 3, client computing device 310 may comprise user interface 315, which may operate to receive, as a result of user interaction with client 310, user formulated queries. A submitted query may, therefore, in an embodiment be transmitted to query server 330 by way of network 320, which may represent the Internet, a local area network, and/or any other electronic computing and/or communications network. Thus, claimed subject matter is not limited in this respect.

In one or more embodiments, queries may be processed by, for example, query processor 340. Query processor 340 may operate to parse queries submitted via a computing device, such as client computing device 310, for storage into query database 325. Accordingly, for example, submitted queries that may pertain to movies presently being shown in theaters and/or cinemas may be categorized within a particular use case of entity type 1 (of FIG. 2), as previously described.

In one or more embodiments, query database 325 may comprise thousands, hundreds of thousands, or a greater number of queries, such as submitted by users, such as users of client computing device 310. Additionally, queries of query database 325 may be indexed in terms of frequency of occurrence of query terms present in received queries in an embodiment. In one possible example, popular queries may be defined as queries received, for example, at greater than a threshold frequency (e.g., queries received per increment of time). Thus, queries stored in query database 325 may correspond to queries submitted by users at a rate of, for example, approximately 1.0 query per second. Less popular queries stored in query database 325 may correspond, for example, queries submitted by users at a rate of, for example, approximately 1.0 query per 5.0 seconds, 1.0 query per 10.0 seconds, and claimed subject matter is not limited in this respect. Of course, alternative approaches to measuring interest and/or popularity may be employed in addition to and/or instead of how frequent a related query is submitted. Thus, in another example, popularity of the query may be defined, at least in part, on a total number related queries submitted (e.g., receipt of 500 total related queries), receipt of an increasing number of related queries (e.g., from five queries per hour to fifteen queries per hour). Interest and/or popularity may be defined using alternative approaches, and claimed subject matter is not limited to any particular metric of query interest and/or popularity.

In one or more embodiments, query server 330 may be utilized to introduce entities into taxonomy 335, for example, using queries extracted from query database 325. Thus, in an embodiment, in response to receipt of a query from, for example, client computing device 310, query processor 340 may begin by comparing a query stored in query database 325 with use cases of, for example, a related use case taxonomy, such as taxonomy 335, for example. In one possible example, just to illustrate, if query processor 340 receives six-term query "Hunger Games Catching Fire Santa Clara show times," the received query may be parsed and compared with query patterns of taxonomy 335 to bring about an index, as illustrated by Table 1 (below):

TABLE 1

| Use Case | Query Number | Contextual Term (Position) | Candidate Segment |
|---|---|---|---|
| 1 | 1 | show time (6) | Hunger (0) |
| 1 | 1 | show time (6) | Games (1) |
| 1 | 1 | show time (6) | Catching (2) |
| 1 | 1 | show time (6) | Fire (3) |
| 1 | 1 | show time (6) | Santa (4) |
| 1 | 1 | show time (6) | Clara (5) |
| 1 | 1 | show time (6) | Hunger Games (0, 1) |
| 1 | 1 | show time (6) | Catching Fire (2, 3) |
| 1 | 1 | show time (6) | Santa Clara (4, 5) [Location] |
| 1 | 1 | show time (6) | Hunger Games Catching Fire (0, 3) |

In generating Table 1, query processor 340 may assign a position identifier, which may be defined as a number corresponding to the place at which a search term appears in a search query. Thus, for example, for the query "Hunger Games Catching Fire Santa Clara show times" "Hunger" may be assigned a position identifier of "0," "Games" may be assigned a position identifier of "1," "Catching" may be assigned a position identifier of "2," "Fire" may be assigned a position identifier of "3," and so forth. Additionally, query processor 340 may be capable of recognizing bigrams such as, for example, "Hunger Games," and "Catching Fire." Accordingly, recognized bigrams (e.g., "Hunger Games" and "Catching Fire") may also entered into Table 1 along with identifiers indicating position of bigrams in a submitted query. It should be noted that query processor 340 may be additionally capable of recognizing trigrams, including other multiword segments of submitted queries and/or similar semantically useful query related term constructs. Thus, claimed subject matter is, of course, not limited to this particular illustrative example.

In one or more embodiments, generating Table 1 may also involve accessing knowledge graph 360, which may comprise a hierarchical representation of a taxonomy to ascertain whether identified query terms correspond to previously known entities of a knowledge graph. For example, in the submitted query "Hunger Games Catching Fire Santa Clara show times," knowledge graph 360 may already comprise one or more entities for "Santa Clara," which may correspond to an entity class [Location]. Thus, in embodiments, existing entities (e.g., Santa Clara) of a knowledge graph may be annotated using appropriate entity classes (e.g., [Location]), for example.

Query processor 340 may further organize a query segment "Hunger Games Catching Fire" using, for example, position identifiers corresponding to position(s) of one or more query terms of a submitted query. Accordingly, in the example of Table 1, in which "Hunger" corresponds to a submitted query term 0 and "Fire" corresponds to a submitted query term 3, query processor 340 may assign query segment "Hunger Games Catching Fire" position identifiers (0, 3) to correspond with relative position of a first (or zeroth) and a last term of the query segment, in this example.

In another example, query processor 340 may similarly process a second query "Hunger Games Catching Fire show times," which may be stored in query database 325. In generating Table 2 (below), for example, query processor 340 may perform operations similar to those performed in generating Table 1, for example. Accordingly, a second query may be parsed and an index, as shown in Table 2 (below), may be generated:

TABLE 2

| Use Case | Query Number | Contextual Term (Position) | Candidate Segment |
|---|---|---|---|
| 1 | 2 | show time (4) | Hunger (0) |
| 1 | 2 | show time (4) | Games (1) |
| 1 | 2 | show time (4) | Catching (2) |
| 1 | 2 | show time (4) | Fire (3) |
| 1 | 2 | show time (4) | Hunger Games (0, 1) |
| 1 | 2 | show time (4) | Catching Fire (2, 3) |
| 1 | 2 | show time (4) | Hunger Games Catching Fire (0, 3) |

For this illustrative example, in generating Tables 1 and 2, a contextual term (e.g., "show time") may be used to attempt to identify potentially applicable use cases. A listing of candidate segments, such as those collected in Tables 1 and 2, for example, may be stored by query server 330 in an index, such 345. Candidate segments may be stored in tables comprising different arrangements and/or expressions, such as of use cases, query numbers, contextual terms, candidate segments, and so forth. Tables may comprise parameters for use on generating an index in addition to and/or in place of those identified in Tables 1 and 2. Likewise, fewer parameters (e.g., a subset) than those identified may be employed. Further, tables having content of use in this context, for example, may be formatted in a particular way and/or stored, such for processing convenience, although claimed subject matter is not limited to a particular format for such content, for example. Likewise, content may be stored in memory in a manner that does not necessarily correspond physically to the arrangement of the tables as illustrated. For example, in an embodiment, memory pointers and/or other approaches may be employed with a result that physical storage of content may not necessarily correspond with a logical association of that content, such as for purposes of generating an index, for example.

In one or more embodiments, aggregator module 350 may be employed to receive electronic digital signals, for example, representing Tables 1 and/or 2 so as to aggregate some candidate segments and so as to discard other candidate segments. One or more examples of criteria may be employed for aggregation and/or reduction of candidate segments. As alluded to, for example, candidate segments that correspond to existing and/or entities likely to exist within a taxonomy or knowledge graph may be omitted. Likewise, candidate segments of little interest may likewise be omitted. Accordingly, in embodiments, aggregator module 350 may combine candidate segments of, for example, Tables 1 and 2 to generate a table representing aggregated segments along with a count to enumerate a number of occurrences of segments of Tables 1 and 2. An example table showing aggregation of Tables 1 and 2 is shown in Table 3 below as an illustrative example:

TABLE 3

| Use Case | Query Number | Context Term (Position) | Candidate Segment |
|---|---|---|---|
| 1 | 1, 2 | show time | Hunger (2) |
| 1 | 1, 2 | show time | Games (2) |
| 1 | 1, 2 | show time | Catching (2) |
| 1 | 1, 2 | show time | Fire (2) |
| 1 | 1, 2 | show time | Hunger Games (2) |
| 1 | 1, 2 | show time | Catching Fire (2) |
| 1 | 1, 2 | show time | Hunger Games Catching Fire (2) |

Wherein the Query Number column of Table 3 (column 2) shows query numbers corresponding to one or more queries comprising a particular candidate segment, for example. Thus, query numbers 1 and 2 include query segments "Hunger," "Games," "Catching," "Fire," as well as bigrams, such as "Hunger Games" and "Catching Fire," in which these terms appear a total of two times in two queries, in this example. Further, the segment "Hunger Games Catching Fire" also appears a total of two times in two queries.

In one or more embodiments, segments of Table 3 may be reduced or discarded based, at least in part, on an estimated likelihood that a segment represents one or more entities not previously existing, such in, for example, knowledge graph 360. For example, in preparing Table 3, aggregator module 350 may identify that a segment "Santa Clara" may correspond, for example, to an entity class (e.g., [Location]) that is already present in taxonomy 335 in this illustration. Accordingly, an entity class (e.g., [Location]) "Santa Clara" may be likely to already be present in knowledge graph 360, for example. Aggregator module 350 may estimate likelihood of one or more segments being in a knowledge graph, such as 360, by way of other approaches also, and claimed subject matter is not limited in this respect. As additional non-limiting examples, frequency of occurring, semantic and/or other types of linguistic similarity, etc., may be used in place of or in addition.

Aggregator module 350 may reduce or discard segments of aggregated query segments of, for example, Table 3 by combining segments that may appear as standalone "search content," for example. In one or more embodiments, search content may comprise two or more query segments appearing at a frequency greater than a lower threshold in a database, such as query database 325. For example, aggregator 350 may access query database 325 to determine that "Hunger Games" and "Catching Fire" may correspond to search content appearing with at least a threshold frequency. Thus, based at least in part on "Hunger Games" and "Catching Fire" appearing at a rate that that falls below a threshold frequency, aggregator module 350 may discard particular segments, such as "Hunger," "Games," "Catching," and "Fire," for example, in this example. Likewise, aggregator 350 may, by way of accessing query database 325, may also determine that "Hunger Games Catching Fire" may correspond to search content appearing with at least a threshold frequency. Accordingly, aggregator module 350 may discard segments of "Hunger Games Catching Fire," such as "Hunger Games" and "Catching Fire" and retain segment "Hunger Games Catching Fire."

Thus, based at least in part on aggregator module 350 discarding segments of Table 3 that may be unlikely to be representative of entities not already existing in knowledge graph 360, Table 4 may be generated, in an embodiment. Accordingly, responsive to discarding segments of Table 3 other than, for example, "Hunger Games Catching Fire," Table 4 may be generated as:

TABLE 4

| Use Case | Query Number | Context Term (Position) | Candidate Segment |
|---|---|---|---|
| 1 | 1, 2 | show time | Hunger Games Catching Fire (2) |

Thus, in particular embodiments, one or more candidate segments of Table 4, as an example, may be formulated based, at least in part, on determining, for example, frequency of occurrence of candidate segments in, for example, query database 325. However, in other embodiments, additional approaches in addition to, or in place of, frequency of use of query segments, as arranged in a query database, for example, may be employed. To name just a few potential possibilities, aggregator module 350 may access a query dictionary (not shown in FIG. 3) as part of a process to identify entity candidates, e.g., new entities. In another embodiment, a contextual analysis platform may be included to perform, for example, natural language processing to identify names of persons, organizations, places, documents and/or document categories, etc. It should be noted that claimed subject matter is intended to not be limited to particular approaches toward identifying entity candidates. That is, a variety of approaches within capabilities of one of ordinary skill are possible and/or may be developed in the future. Any and all such approaches are intended to be within claimed subject matter.

In FIG. 3, candidate segments from aggregator module 350 may be accessed or received by a classifier, such as 355, comprising an entity classifier. In one or more embodiments, classifier 355 may be utilized to determine an entity class to which a candidate segment may belong. In one possible example, classification of entities may reduce or remove ambiguities regarding one or more entity classes. For example, a candidate segment, such as "Hunger Games Catching Fire," may relate to a movie, a book, other literary work, and/or may relate to a charity whose mission is to provide food assistance, just to illustrate a possible ambiguity.

In one or more embodiments, as classifier, such as 355 for entities, may resolve an entity class of a candidate segment using, for example, a query structure of a submitted query, for example, from query database 325. To illustrate, classifier 355 may access previously submitted queries, such as those used to generate Tables 1 and 2, for example. A query "Hunger Games Catching Fire" may, as an illustration, be compared with two query patterns from use case 1A of FIG. 2. In a first instance, "Hunger Games Catching Fire," which may be identified as search content to generate Table 4, may be compared with query pattern 1 from use case 1A, such as [Movie title], [Location], [Theater name], and show times, for example. In one or more embodiments, classifier 355 may determine that a candidate segment, such as "Hunger Games Catching Fire," is unlikely to be representative of a new entity based, at least in part, on existence of three entity classes (e.g., [Movie title], [Location], and [Theater name]) in a query pattern.

However, if candidate segment "Hunger Games Catching Fire" were to be compared with query pattern 2 of use case 1A, comprising an entity class "[Movie title]" and a contextual term "show times," classifier 355 may determine that a candidate segment may be more likely to represent an entity not already existing in knowledge graph 360, for example. In one or more embodiments, classifier 355 may bring about a determination based, at least in part, on existence of a single entity class (e.g., [Movie title]) in query pattern 2 of use case 1A. In some embodiments, based, at least in part, on classifier 355 determining that a new entity may be found, a new entity may be inserted into knowledge graph 360, for example. Thus, in the foregoing example, "Hunger Games Catching Fire" may be inserted into knowledge graph 360 as a new [Movie title] entity class, such as via database management processes.

Figure 4:
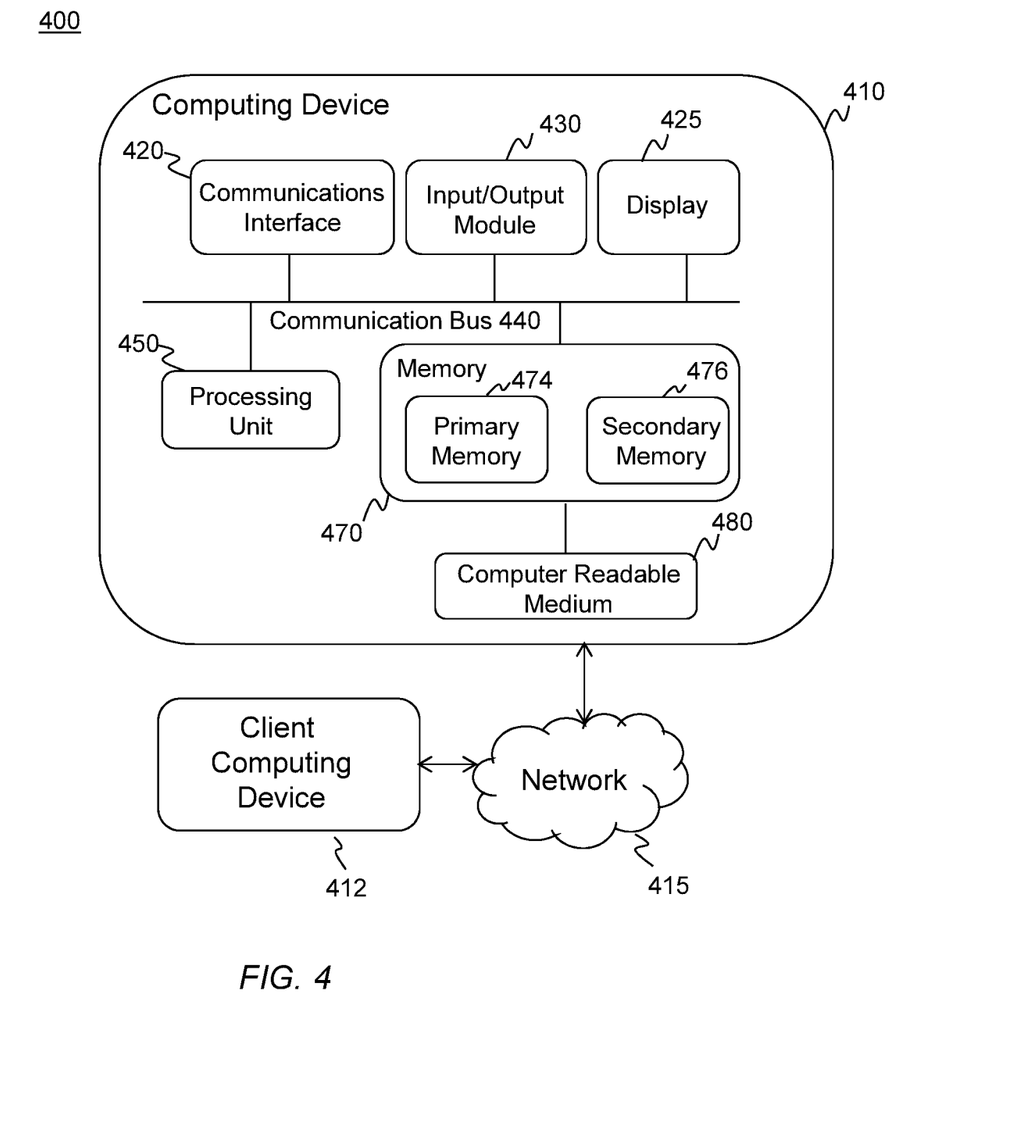
FIG. 4 is a schematic diagram of a computing device that may be employed according to an embodiment.

For purposes of illustration, FIG. 4 is a schematic diagram 400 of a computing platform that may be employed for search query processing according to an embodiment. Computing platform of FIG. 4 may comprise computing device 410 that may be employed to perform functions, such as described herein. In FIG. 4, computing device 410 may interface with client device 412, which may comprise features of a computing device, such as client computing device 310 of FIG. 3, for example. Communications interface 420, processor (e.g., processing unit) 450, and memory 470, which may comprise primary memory 474 and secondary memory 476, may communicate by way of communication bus 440, for example. In FIG. 4, computing device 410 may store various types of computing device-implementable instructions, by way of input/output module 430, for example, such as those that may direct operation and/or result in entity generation from received queries, such as received queries that may be stored in, for example, a query database, such as query database 325 of FIG. 3, as described. Client computing device 412 may communicate with computing device 410 by way of an Internet connection via network 415, for example. Although the computing platform of FIG. 4 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter be limited in scope to illustrative examples.

Processor 450 may be representative of one or more circuits, such as digital circuits, to perform at least a portion of a computing procedure and/or process. By way of example but not limitation, processor 450 may comprise one or more processors, such as controllers, microprocessors, microcontrollers, application specific integrated circuits, digital signal processors, programmable logic devices, field programmable gate arrays, and the like, and/or any combination thereof. In implementations, processor 450 may perform signal processing, such as to manipulate signals and/or states, and/or to construct signals and/or states, for example.

Memory 470 may be representative of any storage mechanism. Memory 470 may comprise, for example, primary memory 474 and secondary memory 476, additional memory circuits, mechanisms, and/or combinations thereof may be used. Memory 470 may comprise, for example, random access memory, read only memory, and/or one or more data storage devices or systems, such as, for example, a disk drive, an optical disc drive, a tape drive, a solid-state memory drive, just to name a few examples. Memory 470 may be utilized to store a program, as an example. Memory 470 may also comprise a memory controller for accessing storage media, such as computer readable-medium 480 that may generate electronic signals representing entities leveraged from, for example, query patterns of one or more use cases from a related and user intent centric taxonomy, for example, in an embodiment. Under direction of processor 450, memory, such as cells storing physical states, representing for example, a program, may be executed by processor 450 and generated signals may be transmitted via the Internet, for example. Processor 450 may also receive digitally-encoded signals from computing device 410.

Network 415 may comprise one or more communication links, processes, and/or resources to support exchanging communication signals between a client and server, which may, for example, comprise one or more servers. By way of example, but not limitation, network 415 may comprise wireless and/or wired communication links, telephone and/or telecommunications systems, Wi-Fi networks, Wi-MAX networks, the Internet, the web, a local area network (LAN), a wide area network (WAN), and/or any combination thereof.

The term "computing platform," as used herein, refers to a system and/or a device, such as a computing device, that includes a capability to process and/or store values, such as binary digital values, in the form of signals and/or states. Thus, a computing platform, in this context, may comprise hardware, software, firmware, and/or any combination thereof (other than software per se). Computing platform 410, as depicted in FIG. 4, is merely one example, and claimed subject matter is not limited to this particular example. For one or more embodiments, a computing platform may comprise any of a wide range of digital electronic devices, including, but not limited to, personal desktop and/or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 470 may store cookies relating to one or more users and may comprise a computer-readable medium that may carry and/or make accessible content, code and/or instructions, for example, executable by processor 450 and/or some other controller and/or processor capable of executing instructions, for example. A user may make use of an input device, such as a computer mouse, stylus, track ball, keyboard, and/or any other device capable of receiving an input from a user.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly or otherwise organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, and/or other technologies, and/or the like. Network access technologies may enable wide area coverage for devices, such as client devices with varying degrees of mobility, for example.

A network may enable radio frequency and/or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and/or other, and/or the like. A wireless network may include virtually any type of now known, and/or to be developed, wireless communication mechanism by which signals may be communicated among devices, such as a client device and/or a computing device, between and/or within a network, and/or the like.

Communications between a computing device and a wireless network may be substantially in accordance with known, and/or to be developed cellular telephone communication network protocols including, for example, global system for mobile communications (GSM), enhanced data rate for GSM evolution (EDGE), and/or worldwide interoperability for microwave access (WiMAX). A computing device may also have a subscriber identity module (SIM) card, which, for example, may comprise a detachable smart card that stores subscription information of a user, and/or may also store a contact list of a user. A user may own a computing device and/or may be its primary user, for example. A computing device may be assigned an address by a wireless and/or wired telephony network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, and/or or combination thereof.

A computing device may vary in terms of capabilities and/or features. Claimed subject matter is intended to cover a wide range of potential variations. For example, a network device may include a numeric keypad and/or other display of limited functionality, such as a monochrome liquid crystal display (LCD) for displaying text. In contrast, however, as another example, a web-enabled computing device may include a physical and/or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include and/or may execute a variety of now known, and/or to be developed operating systems, and/or derivatives and/or versions, including personal computer operating systems, such as a Windows, iOS and/or Linux, and/or a mobile operating system, such as iOS, Android, and/or Windows Mobile, and/or the like. A computing device may include and/or may execute a variety of possible applications, such as a client software application enabling communication with other devices, such as communicating one or more messages, such as via email, short message service (SMS), and/or multimedia message service (MMS), including via a network, such as a social network including, but not limited to, Facebook, LinkedIn, Twitter, Flickr, and/or Google+, to provide only a few examples. A computing device may also include and/or execute a software application to communicate content, such as, for example, textual content, multimedia content, and/or the like. A computing device may also include and/or execute a software application to perform a variety of possible tasks, such as browsing, searching, playing various forms of content, including locally stored or streamed video, and/or games such as, but not limited to, fantasy sports leagues. The foregoing is provided merely to illustrate that claimed subject matter is intended to include a wide range of possible features and/or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with and/or substantially compatible with any past, present and/or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, and/or another existing protocol, and/or another protocol that may be developed.

A network may be compatible with now known, and/or to be developed, past, present, and/or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network may employ, for example, TCP/IP, UDP, DECnet, NetBEUI, IPX, Appletalk, other, and/or the like. Versions of the Internet Protocol (IP) may include IPv4, IPv6, other, and/or the like.

It will, of course, be understood that, although particular embodiments will be described, claimed subject matter is not limited in scope to a particular embodiment and/or implementation. For example, one embodiment may be in hardware, such as implemented to operate on a device and/or combination of devices, for example, whereas another embodiment may be in software on a device. Likewise, an embodiment may be implemented in firmware, and/or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, and/or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units and/or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms, and/or symbolic representations of operations on binary signals and/or states, such as stored within a memory of a specific apparatus and/or special purpose computing device or platform. In the context of this particular specification, the term specific apparatus and/or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed and/or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these and/or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero and/or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous and/or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero and/or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

What is claimed is:

1. An apparatus, comprising:
  a remote server comprising one or more processors to process digital signals to:
    generate one or more new entities in a knowledge graph;
    generate an arrangement of nodes, in a database representation of the knowledge graph, to correspond to the one or more new entities to be based, at least in part, on analysis of one or more use cases to comprise user-submitted search query patterns, wherein the analysis is to:
      parse one or more search queries to be received from a local computing device via a communications network to form one or more query pattern segments to comprise one or more terms;
      semantically relate at least one term of the one or more terms to a taxon of a query pattern of a use case of the one or more use cases;
      assign one or more position identifiers to places at which the one or more terms appear in the one or more parsed search queries to be based, at least in part, on the at least one query pattern;
    generate an index to be based, at least in part, on the assignment of the one or more position identifiers;
    generate electronic signals or states, to comprise one or more new entities to be identified from the taxon of the query pattern of the use case of the one or more use cases, the generated electronic signals or states additionally to insert the one or more new entities into the knowledge graph; and
    initiate transmission of one or more electronic signals to the local computing device via the communications network to comprise at least a portion of the knowledge graph and relevant search results to be responsive to processing a query via a search engine, wherein the generated links of the knowledge graph relevant to the one or more new entities are to be determined prior to receipt of the query.

2. The apparatus of claim 1, the remote server is to additionally:
  infer intent of the one or more parsed search queries utilizing the at least one term semantically related to the taxon of the query pattern of the use case of the one or more use cases.

3. The apparatus of claim 1, wherein the knowledge graph is to comprise an existing knowledge graph to which at least one of the one or more new entities is to be connected.

4. The apparatus of claim 1, wherein the at least one query pattern is to comprise one or more entity classes and one or more contextual terms.

5. The apparatus of claim 1, the remote server is to is to additionally:
  generate electronic signals or states representing an index to identify one or more candidate segments, the one or more candidate segments to include at least one of the one or more new entities to be identified from the one or more use cases.

6. The apparatus of claim 5, the remote server is to is to additionally:
  generate electronic signals or states to discard at least one of the one or more candidate segments.

7. The apparatus of claim 6, wherein the generated electronic signals or states to discard the at least one of the one or more candidate segments is based, at least in part, on one or more previously existing entities.

8. The apparatus of claim 6, the remote server is to is to additionally:
  generate electronic signals or states to discard at least one of the one or more candidate segments based, at least in part, upon a frequency of occurrence.

9. The apparatus of claim 5, the remote server is to is to additionally:
  generate electronic signals or states to compare at least one of the one or more candidate segments with the at least one query pattern from at least one of the one or more use cases.

10. The apparatus of claim 1, wherein the one or more new entities form a taxonomy comprising the one or more use cases and the at least one query pattern.

11. The apparatus of claim 10, wherein the taxonomy comprises at least one of a connected graph with cycles or a connected graph without cycles.

12. A method comprising:
  generating one or more new entities in a knowledge graph;
  generating an arrangement of nodes, in a database representation of the knowledge graph at a remote server, to correspond to the one or more new entities to be based, at least in part, on analysis of one or more use cases to comprise user-submitted search query patterns, wherein the analysis is to:
    parse at least one search query to be received from a local computing device via a communications network to form one or more query pattern segments comprising one or more terms;
    semantically relate at least one term of the one or more terms to a taxon of a query pattern of a use case of the one or more use cases;
    assign one or more position identifiers to places at which one or more terms appear in the at least one parsed search query based, at least in part, on the at least one query pattern;
  generate electronic signals or states, comprising one or more new entities to be identified from the taxon of the query pattern of the use case of the one or more use cases, the generated electronic signals or states additionally to insert the one or more new entities into the knowledge graph;
  generate an index based, at least in part, on the assignment of the one or more position identifiers; and initiate transmission of one or more electronic signals to the local computing device via a communications network to comprise at least a portion of the knowledge graph and relevant search results responsive to processing a query via a search engine, wherein the generated links of the knowledge graph relevant to the one or more new entities are to be determined prior to receipt of the query.

13. The method of claim 12, further comprising comparing at least one of one or more candidate segments with the at least one query pattern from the one or more use cases.

14. The method of claim 12, further comprising inserting at least one of one or more candidate segments identified from a taxonomy of the one or more use cases into the knowledge graph.

15. The method of claim 12, further comprising determining at least one of one or more candidate segments from the at least one query pattern.

16. An apparatus comprising:
at least one special-purpose computing device of a remote server comprising a processor to process digital signals to:
parse at least one search query to be received from a local computing device via a communications network to form one or more query pattern segments to comprise one or more terms;
semantically relate at least one term of the one or more terms to a taxon of a query pattern of a use case of the one or more use cases;
assign one or more position identifiers to places at which one or more terms appear in the at least one parsed search query to be based, at least in part, on the at least one query pattern;
generate an index to be based, at least in part, on the assignment of the one or more position identifiers;
generate electronic signals or states, to comprise one or more new entities to be identified from the taxon of the query pattern of the use case of the one or more use cases, the generated electronic signals or states additionally to insert the one or more new entities into a knowledge graph; and
communicate with a communications network to provide at least a portion of the knowledge graph and relevant search results responsive to a processing of a query via a search engine, wherein the generated links of the knowledge graph relevant to the one or more new entities are to be determined prior to receipt of the query.

17. The apparatus of claim 16, wherein the at least one special-purpose computing device is to compare one or more candidate segments with the at least one query pattern from the one or more use cases.

18. The apparatus of claim 16, wherein the at least one special-purpose computing device is to determine one or more candidate segments from one or more user-submitted search query patterns.

19. The apparatus of claim 18, at least one special-purpose computing device is to discard one or more candidate segments based, at least in part, on the one or more candidate segments to correspond to search content.

20. The apparatus of claim 18, at least one special-purpose computing device is to discard one or more candidate segments based, at least in part, on frequency of occurrence of the one or more candidate segments.

* * * * *